United States Patent [19]
Behl et al.

[11] Patent Number: 6,142,796
[45] Date of Patent: Nov. 7, 2000

[54] COLLAPSIBLE HARD DISK DRIVE DOCKING ADAPTER

[76] Inventors: Sunny Behl, 5721 Tubac La., San Jose, Calif. 95118; Chris Erwin, 177 Shaniko Common, Fremont, Calif. 94539

[21] Appl. No.: 09/330,431

[22] Filed: Jun. 8, 1999

[51] Int. Cl.[7] .................................................. H01R 13/44
[52] U.S. Cl. ........................................... 439/131; 361/685
[58] Field of Search .................................... 439/131, 374, 439/377; 361/685

[56] References Cited

U.S. PATENT DOCUMENTS

| | | | |
|---|---|---|---|
| 5,325,270 | 6/1994 | Wenger et al. ......................... | 361/797 |
| 5,535,093 | 7/1996 | Noguchi et al. ........................ | 361/686 |
| 5,913,926 | 6/1999 | Andaerson et al. ..................... | 714/6 |
| 5,980,276 | 11/1999 | Arita et al. ............................. | 439/131 |

*Primary Examiner*—Neil Abrams
*Assistant Examiner*—Eugene G. Byrd
*Attorney, Agent, or Firm*—Kevin H. Fortin

[57] ABSTRACT

A folding docking adapter for a hard disk drive or other memory storage device, includes a base, a backplane and a hinge. The base is for receiving a hard disk drive carrier. The back plane has a data connector for coupling with the hard disk drive carrier. The hinge attaches between the base and the backplane to enable the backplane to fold between an operative configuration and a collapsed configuration.

20 Claims, 5 Drawing Sheets

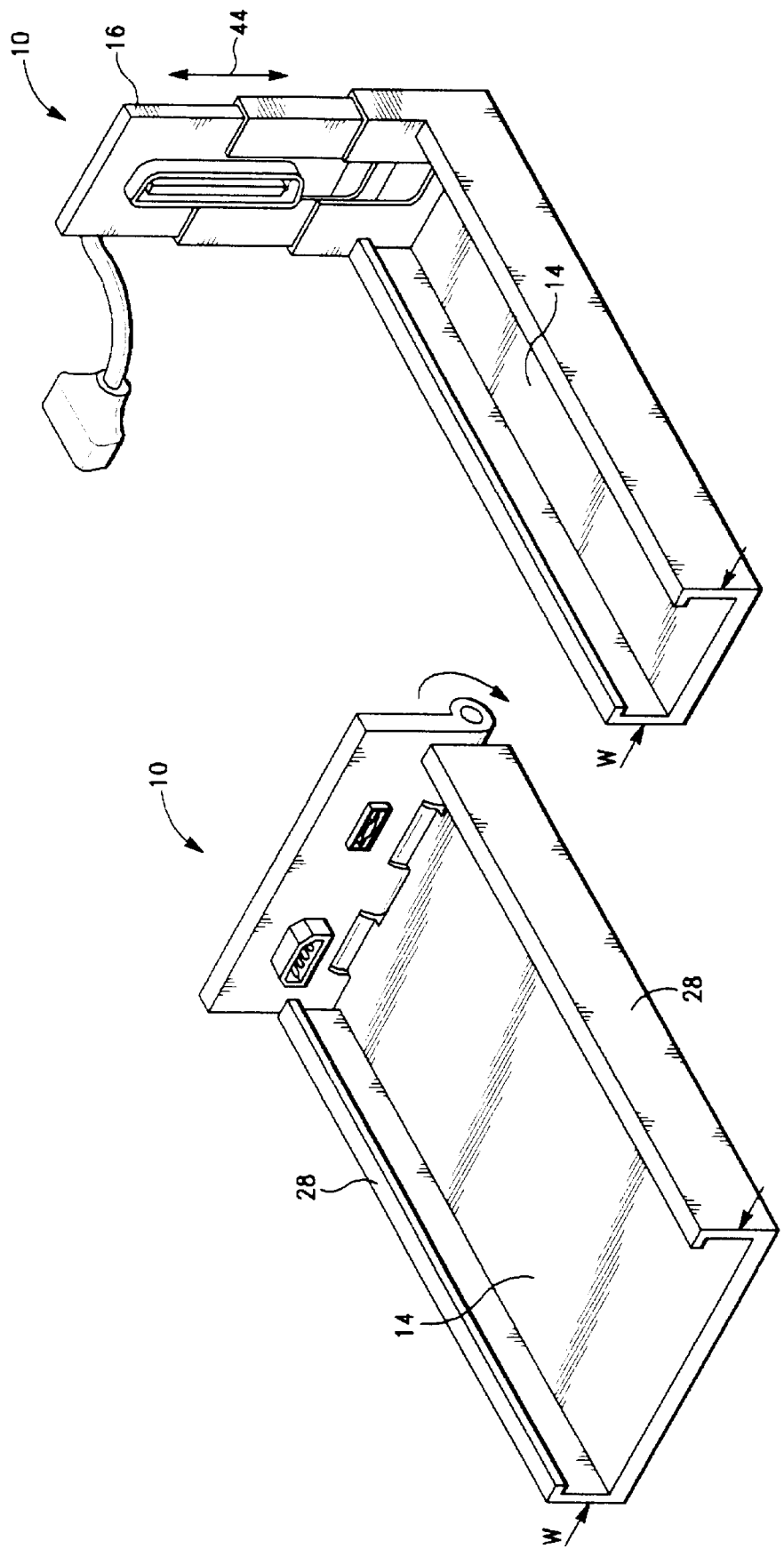

COLLAPSIBLE HARD DISK DRIVE DOCKING ADAPTER

FIELD OF THE INVENTION

The present invention pertains to external hard disk drive docking adapters, and more particularly, collapsible external hard disk drive docking adapters.

BACKGROUND OF THE INVENTION

IEEE 1394-1995 is the Institute of Electrical and Electronic Engineers, Inc. designation for a recently developed high speed serial bus. This designation is often referred to as IEEE1394, or the 1394 standard. The 1394 standard serial bus defines both a backplane physical layer and a point-to-point cable connected virtual bus. The backplane version operates at 12.5, 25 or 50 Mbits/sec. The cable version supports data rates of 100, 200 and 400 Mbits/sec across a cable medium. What this all means is that electronic devices can communicate faster than ever before across a cable medium.

External hard disk drives have been coupled, via a serial cable to the RS232 serial port of a desktop computer. The drawbacks of using serial ports and a serial cable for external hard disk drive are numerous. First, RS232 serial ports have a much slower throughput than optimal for a typical hard disk drive. Second, the length of the RS232 serial cable is limited. Third, "hot plugging" devices into a RS232 serial connector is not typically effective with today's hardware and operating systems. These are just a few examples.

The 1394 standard cable connection allows significantly improves data transfer rates, permits serial connection of numerous devices, facilitates "hot plugging" of devices and allows devices to be distanced further apart from each other. Other standards are expected to evolve, and succeed in replacing the 1394 standard with even faster throughput capability.

SUMMARY OF THE INVENTION

A folding docking adapter for a hard disk drive or other memory storage device, includes a base, a backplane and a hinge. The base is for receiving a hard disk drive carrier. The back plane has a data connector for coupling with the hard disk drive carrier. The hinge attaches between the base and the backplane to enable the backplane to fold between an operative configuration and a collapsed configuration.

According to a variation of the invention, the backplane telescopes to collapse the docking adapter for transport.

According to another variation of the invention, the docking adapter is integrated with a hard drive carrier. The docking adapter has a backplane that hinges to the carrier from an open configuration to a closed configuration. The backplane has various connectors so that in the closed configuration the carrier can couple with a memory storage device bay to function as an internal hard disk drive carrier, and so that in the open configuration the backplane couples with an IEEE 1394 compliant system so that carrier also functions also as an external hard disk drive carrier.

BRIEF DESCRIPTION OF THE DRAWINGS

FIG. 5 shows an alternate embodiment of a folding hard disk drive docking adapter.

FIG. 6 shows an alternate embodiment of a folding hard disk drive docking adapter having a telescoping connector.

DETAILED DESCRIPTION OF THE INVENTION

Figure 1:
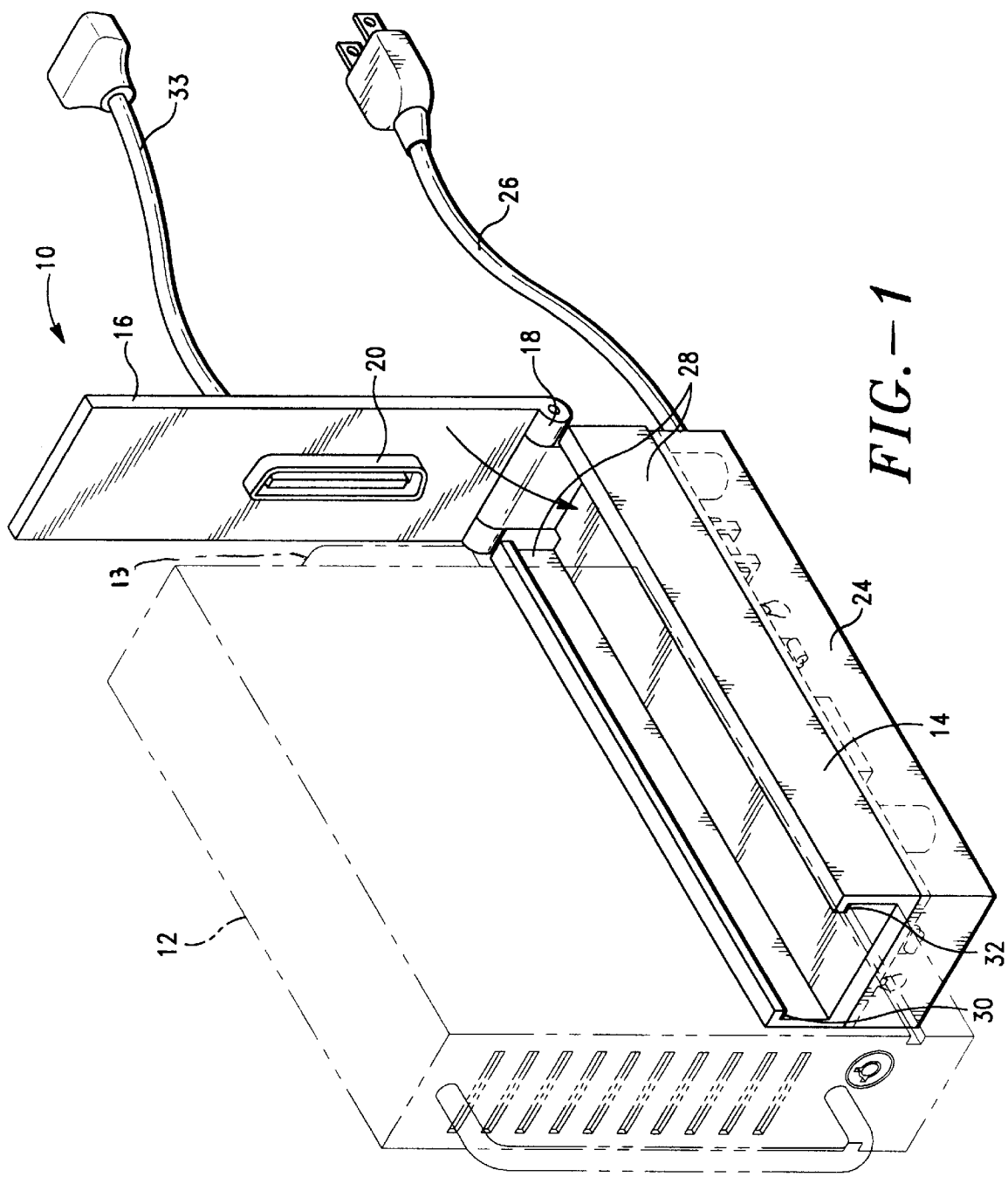
FIG. 1 shows a hard disk drive carrier and a docking adapter in an operative configuration in accordance with the present invention.

FIG. 1 shows a collapsible docking adapter generally designated with the reference numeral 10. The docking adapter 10 receives a carrier 12, which houses a hard disk drive or other memory storage device. The carrier 12 houses a hard disk drive 42. The carrier 12 has a data connector 13 electrically connected with the hard disk drive 42. The docking adapter 10 of the present invention can be used with video recorders, sound recorders, micro computers and other electronic devices that may require memory storage capability.

The docking adapter 10 includes a base 14, a backplane 16 and a hinge 18. The hinge attaches between the base 14 and the backplane 16 to enable the backplane 16 to fold between an operative configuration as shown, and a collapsed configuration.

In the operative configuration, the backplane 16 extends perpendicularly from the base 14. The backplane 16 has a data connector 20 for coupling with the carrier 12 to communicate data to and from any hard disk drive or other memory storage device housed by the carrier 12.

The carrier 12 can be of any type used to carry a hard disk drive, optical drive, other memory storage device, or any electronic consumer product. Examples of commonly used carriers 12 are disclosed by U.S. Pat. Nos. Re 34,369; 5,797,667; 5,694,290; 5,767,445; and commonly assigned U.S. patent application Ser. No. 09/298,139. The disclosures of these cited US Patents and this commonly assigned U.S. Patent Application are incorporated herein by reference. Accordingly, the term hard disk drive can be broadly interpreted herein as being a generic term for virtually any memory storage device.

The data connector 20 is of any type that commonly interconnects with a carrier 12. Accordingly, the data connector 20 can be a pin-type connector as show, but may also be a card edge-type or other type of connector. Preferably, the data connector 20 resists damage during "hot plugging" or "hot swapping" of the carrier 12. The data connector 20 couples with an IEEE 1394 cable 33.

According to one aspect of the invention, the base 14 includes a power supply 24 with a power cord 26 for powering the carrier 12 and the hard disk drive. The power supply 24 delivers power to the carrier 12 via the data connector 20. The carrier 12 is configured with the appropriate circuitry to deliver power from the data connector 20 to the hard disk drive housed by the carrier 12. It can be appreciated that the power supply 24 may not be required with 1394 connections.

The base 14 has a pair of lateral sides 28 that extend along the base 14 for holding the carrier 12. The lateral sides 28 have guides 30 and 32 that overhang the lateral sides 28 and slidably guide the carrier 12 into the adapter 10. Preferably, the guides 30 and 32 extend towards each other. It can be appreciated that the guides 30 and 32 may in an alternate embodiment extend away from each other to accommodate carriers having various configuration options. It can also be appreciated that a locking mechanism can be provided to selectively lock and unlock the carrier 12 on the base 14.

The backplane 16 extends perpendicularly from the base 14 when the backplane 16 is in the operative configuration as shown. This enables the carrier 12 to couple with the data connector 20.

Figure 2:
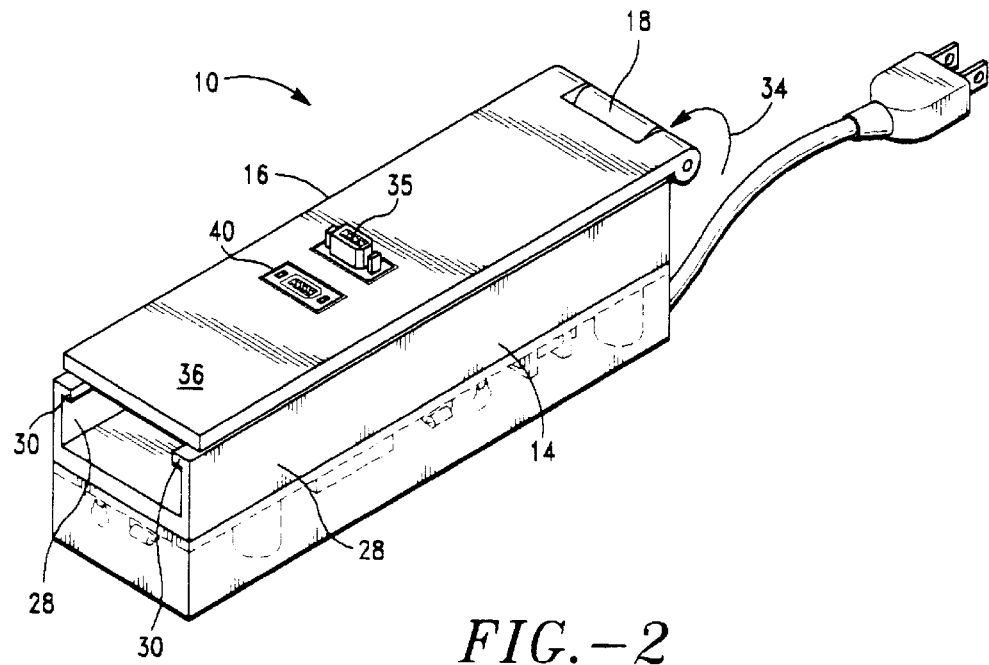
FIG. 2 shows the docking adapter of FIG. 1 folded into a collapsed configuration.

FIG. 2 shows the adapter 10 in a collapsed configuration. The hinge 18 rotates the backplane 16 in the direction of the arrow 34. The backplane 16 parallels the base 14 and folds flat on the guides of the lateral sides 28. The lateral sides 28 function to protect the connector 20 (FIG. 1) between the lateral sides 28. Collapsing the backplane 16 protects the adapter 10 components and eases transport and storage of the adapter 10.

The backplane 16 has an outer face 36. An IEEE 1394 connector 35 extends out from the face 36. A second data connector 40 couples with the IEEE 1394 connector 35 and mounts on the face 36 to enable additional electronic devices to daisy chain to the adapter 10.

Figure 3:
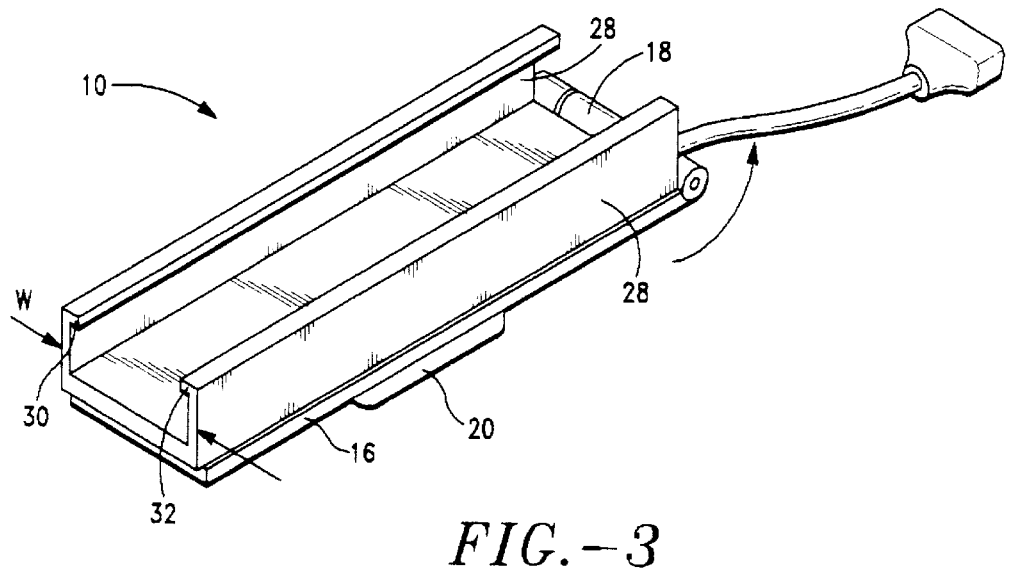
FIG. 3 shows an alternate embodiment of a hard disk drive carrier docking adapter folded into a collapsed configuration.
Figure 4:
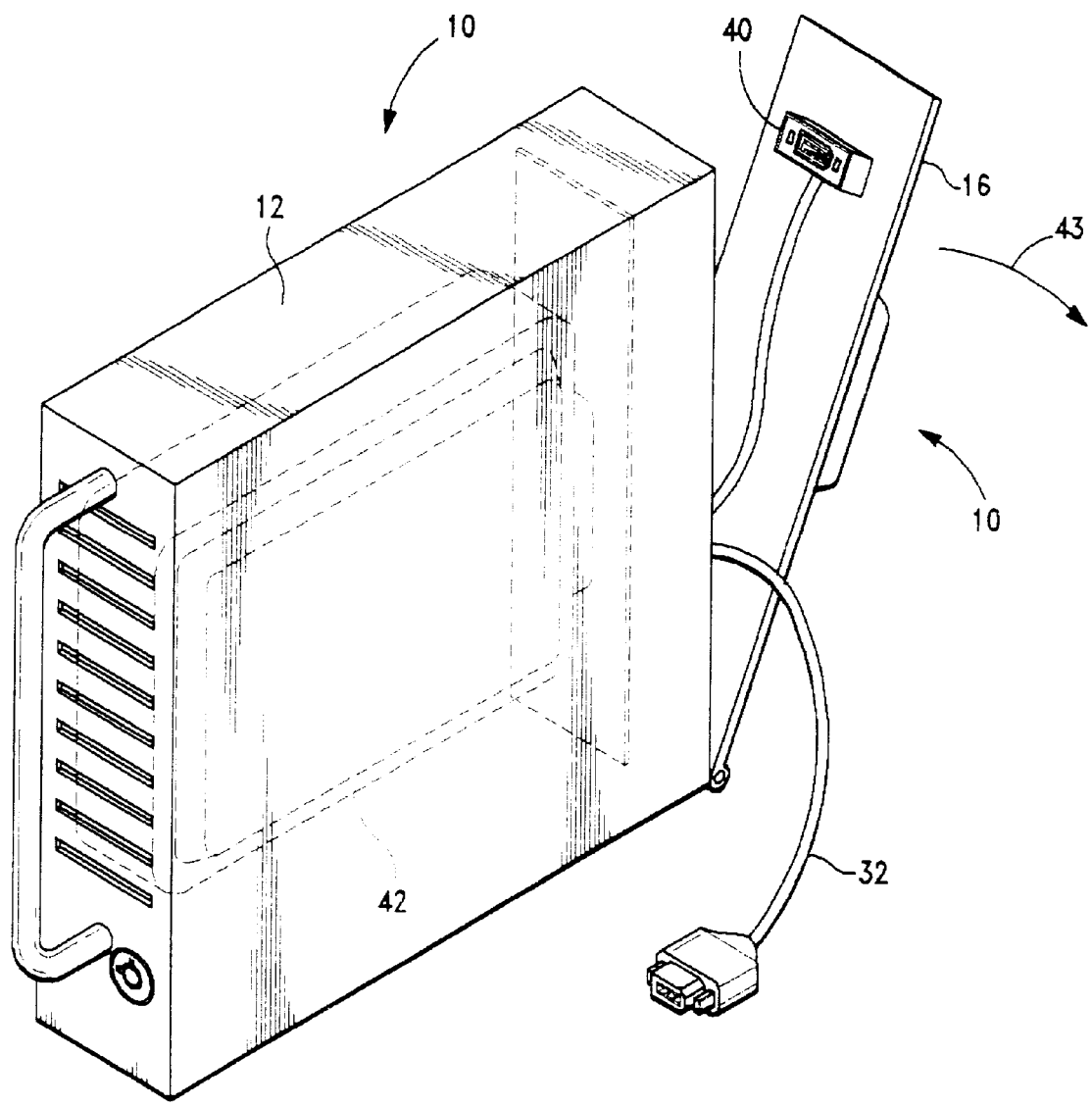
FIG. 4 shows a hard disk drive carrier having an integrated folding docking adapter in accordance with the present invention.

FIG. 3 shows a variation of the adapter 10 in a collapsed configuration. The hinge 18 rotates the backplane 16, exposing the lateral sides 28 and the guides 30 and 32. Exposing the lateral sides 28 and the guides 30 enable the adapter 10 to collapse even when attached to the carrier 12 (FIG. 1). Accordingly, the adapter 10 and the carrier 12 may be transported together. FIG. 4 shows a variation of the adapter 10 having the backplane 16 integrated and hinged with the carrier 12. The adapter 10 enables the carrier 12 to couple the hard disk drive 42 with a standard hard disk drive bay. The adapter 10 alternately functions as an external hard disk drive 42 adapter.

The back plane 16 closes against the carrier 12 and locks in the closed position for transport and for docking in a standard memory hard drive bay. The back plane 16 opens from the carrier 12 in the direction of the arrow 43 to expose the connector 40 and the cable 32. Accordingly, when the backplane 16 opens, the adapter 10 is can attach to any IEEE 1394 compatible system. Closing the backplane 16 onto the carrier 12 enables the carrier 12 and the backplane 16 to protect the cable 32. In the closed position, the adapter 10 may slide into an operative connection with a standard hard disk drive docking bay. Accordingly, the carrier 12 is adapted to enable use of a hard disk drive 42 as either an internal hard disk drive or as an external hard disk drive.

FIG. 5 shows the docking adapter 10 having a base 14 with a width "W". The width "w" is greater than five and a quarter inches to accommodate a flat mounted, and standard sized hard disk drive carrier. The width "w" is measured as the distance between the outer boundaries of the lateral sides 28. Accordingly, the docking adapter 10 is flat mounted. Flat mounted docking adapters 10 enable stacking of external hard disk drives and other devices.

FIG. 6 shows a hard disk drive docking adapter 10 having a telescoping backplane 16. The backplane 16 telescopes from an operative configuration to a collapsed configuration in a direction shown by the arrow 44. The base 14 has a width "w" of less than three inches to accommodate a side mounted hard disk drive carrier. Side mounted adapters 10 can be shelved like books on a desktop, for example, to conserve space when multiple adapters 10 are used.

Figure 7:
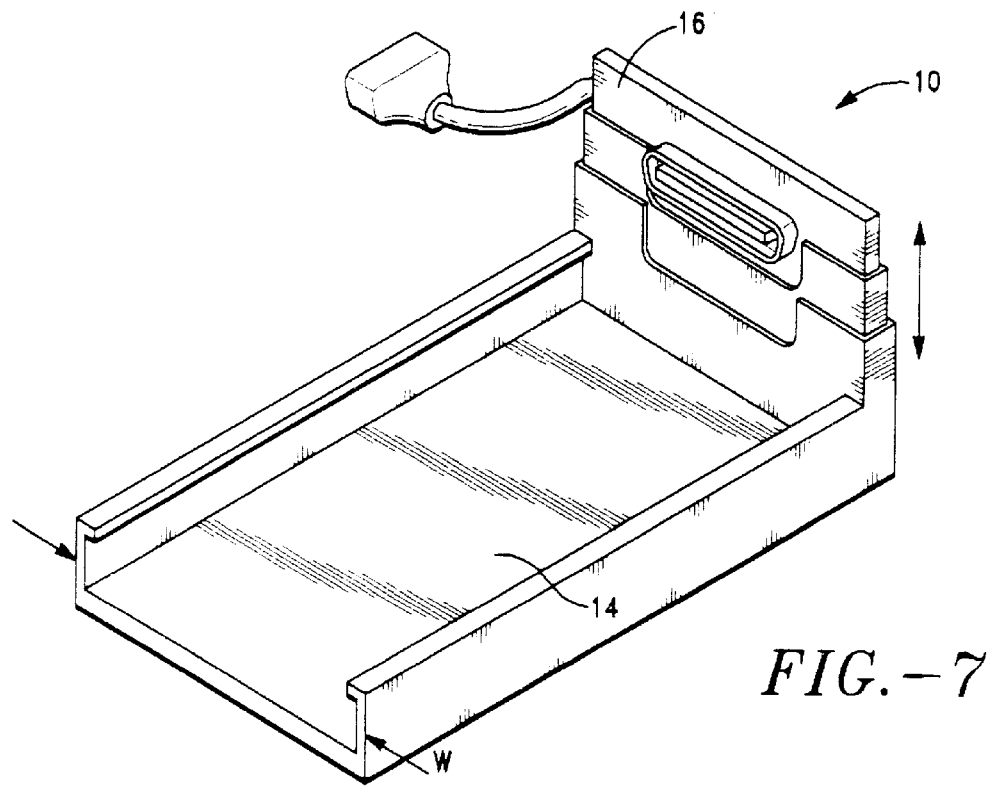
FIG. 7 shows an alternate embodiment of a hard disk drive docking adapter having a telescoping connector.

FIG. 7 shows the docking adapter 10. The base 14 has a width "w". The backplane 16 telescopes to accommodate carriers having connectors positioned at any of a variety of heights.

Figure 8:
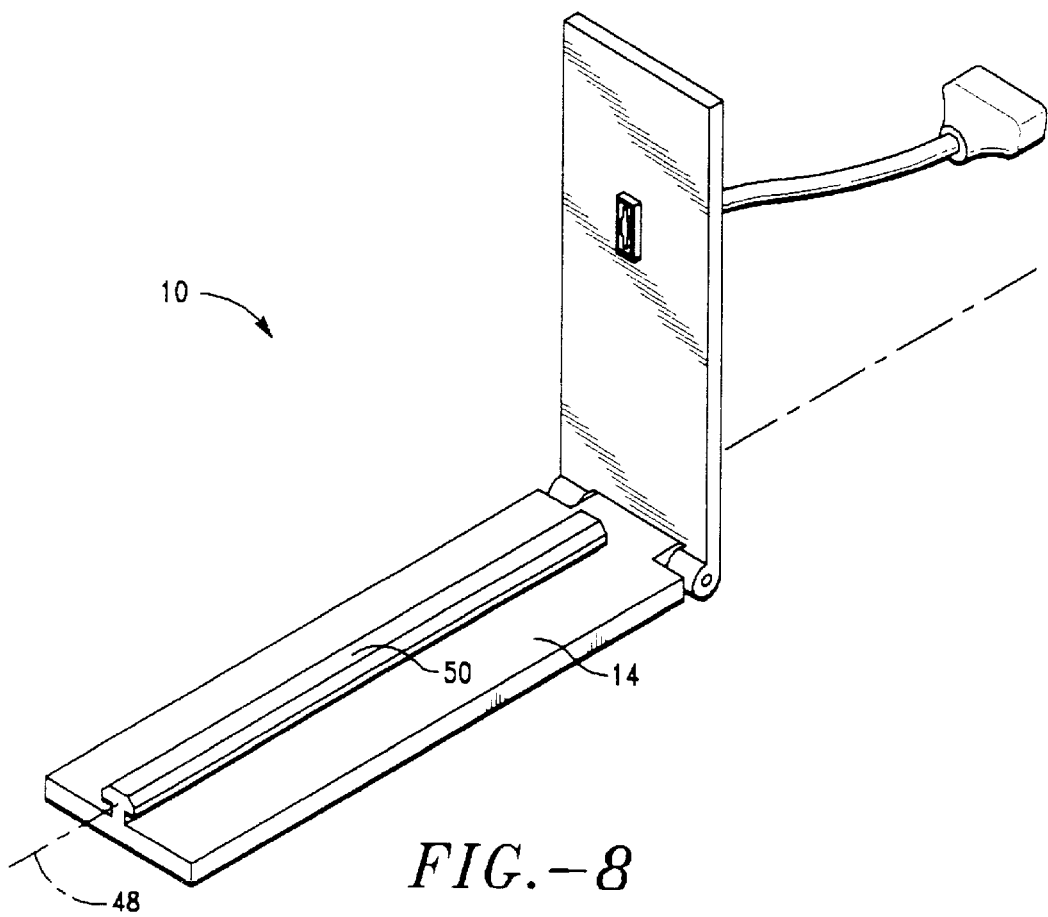
FIG. 8 shows an alternate embodiment of a hard disk drive carrier docking adapter in an operative configuration and having an axially aligned mounting rail.

FIG. 8 shows a docking adapter 10 wherein the base 14 has an axis 48. A single rail mount 50 extends on the axis 48 and attaches to the base 14 to hold a hard disk drive carrier.

What claimed is:

1. A folding docking adapter comprising:
   a carrier for housing a hard disk drive, the carrier having a data connector electrically connected with a hard disk drive;
   a base for receiving the hard disk drive carrier;
   a back plane having a data connector for coupling with the data connector of the hard disk drive carrier; and
   a hinge attached between the base and the backplane to enable the backplane to fold between an operative configuration and a collapsed configuration.

2. A docking adapter as set forth in claim 1, wherein the backplane extends perpendicular to the base when the backplane is in the operative configuration.

3. A docking adapter as set forth in claim 1, wherein the backplane parallels the base when the backplane is in the collapsed configuration.

4. A docking adapter as set forth in claim 1, wherein the base includes a pair of lateral sides for holding the carrier.

5. A docking adapter as set forth in claim 1, wherein the data connector couples with an IEEE 1394 cable.

6. A docking adapter as set forth in claim 5, wherein the backplane includes a second data connector coupled with the IEEE 1394 cable to enable additional electronic devices to daisy chain to the IEEE 1394 cable.

7. A docking adapter as set forth in claim 1, wherein the connector includes a pin-type connector.

8. A docking adapter as set forth in claim 1, wherein the connector includes a a card edge-type connector to enable the "hot plugging" of the hard disk drive into the hard disk drive adapter.

9. A docking adapter as set forth in claim 1, wherein the base includes a power supply for delivering power to the external hard disk drive.

10. A docking adapter as set forth in claim 1, wherein the base includes a pair of lateral sides, the backplane folds against the lateral sides to facilitate transport or storage of the docking adapter.

11. A folding docking adapter comprising:
    a base for receiving a hard disk drive carrier;
    a back plane having a data connector for coupling with the hard disk drive carrier;
    a hinge attached between the base and the backplane to enable the backplane to fold between an operative configuration and a collapsed configuration; and
    the base includes a pair of lateral sides, the backplane folds away from the lateral sides to facilitate transport or storage of the docking adapter.

12. A docking adapter as set forth in claim 1, wherein the base has a width "w" of less than three inches to accommodate a side mounted hard disk drive.

13. A docking adapter as set forth in claim 1, wherein the base has a width "w" of greater than five and a quarter inches to accommodate a flat mounted hard disk drive.

14. A docking adapter as set forth in claim 1, wherein the base has an axis, a single rail mounts on the axis to hold a hard disk drive carrier.

15. A hard disk drive docking adapter comprising:
- a carrier for housing a hard disk drive, the carrier having a data connector electrically connected with a hard disk drive;
- a base for receiving the hard disk drive carrier;
- a back plane having a data connector for coupling with the hard disk drive carrier, the connector telescopes from a collapsed configuration to an operative configuration.

16. A docking adapter as set forth in claim 15, wherein the backplane extends perpendicularly from the base.

17. A docking adapter as set forth in claim 15, wherein the connector couples with an IEEE 1394 cable.

18. A docking adapter as set forth in claim 15, wherein the base has a width "w" of less than three inches to accommodate a side mounted hard disk drive carrier.

19. A docking adapter as set forth in claim 15, wherein the base has a width "w" of greater than five and a quarter inches to accommodate a flat mounted hard disk drive carrier.

20. A carrier having an integrated docking adapter comprising:
- a carrier for holding a hard disk drive, the carrier being configured for removeably inserting a hard disk drive into a hard drive bay;
- a backplane attached to the carrier, the backplane having a first data connector for coupling with the hard disk drive and a second data connector for coupling the carrier with an IEEE 1394 compliant system; and
- a hinge attached between the backplane and the carrier to fold the backplane between an open configuration and a closed configuration.

* * * * *